United States Patent [19]

Volkov et al.

[11] 4,003,272
[45] Jan. 18, 1977

[54] HARMONIC GEAR REDUCTION UNIT

[76] Inventors: Dmitry Pavlovich Volkov, Kolpachny pereulok, 6, kv. 104; Alexandr Filippovich Krainev, Bratskaya ulitsa 23, korpus 1, kv. 4; Alexandr Alexeevich Stupakov, Rossoshanskaya ulitsa 13, korpus 1, kv. 545, all of Moscow; Stanislav Vasilievich Bondarenko, ulitsa Schelkovskaya, 12, kv. 80, Moskovskaya oblast, Mytischi, all of U.S.S.R.

[22] Filed: Jan. 31, 1975

[21] Appl. No.: 545,931

[52] U.S. Cl. .................................. 74/640; 74/800
[51] Int. Cl.² .................... F16H 37/00; F16H 1/28
[58] Field of Search ................... 74/640, 800

[56] References Cited
UNITED STATES PATENTS

| | | | |
|---|---|---|---|
| 3,005,358 | 10/1961 | Musser | 74/640 |
| 3,178,963 | 4/1965 | Musser | 74/640 |
| 3,331,974 | 7/1967 | Proctor | 74/640 X |
| 3,546,966 | 12/1970 | Brooks | 74/640 |

*Primary Examiner*—Benjamin W. Wyche
*Assistant Examiner*—Lance W. Chandler
*Attorney, Agent, or Firm*—Lackenbach, Lilling & Siegel

[57] ABSTRACT

A flexible member in a harmonic gear reduction unit is operatively connected at its other end also to an output member of the gear reduction unit through a second coupling arranged symmetrically with respect to the first coupling about an axis of engagement between the teeth of the flexible and rigid members, elements imparting radially directed deformations to the flexible member being also arranged in the unit symmetrically about the axis of engagement between the teeth of the flexible and rigid members.

3 Claims, 9 Drawing Figures

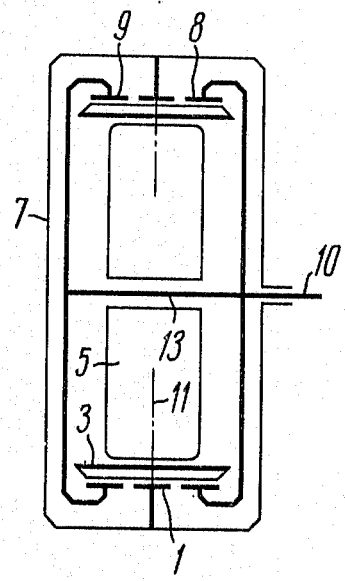
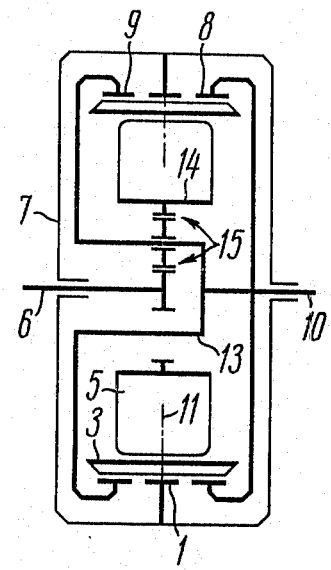
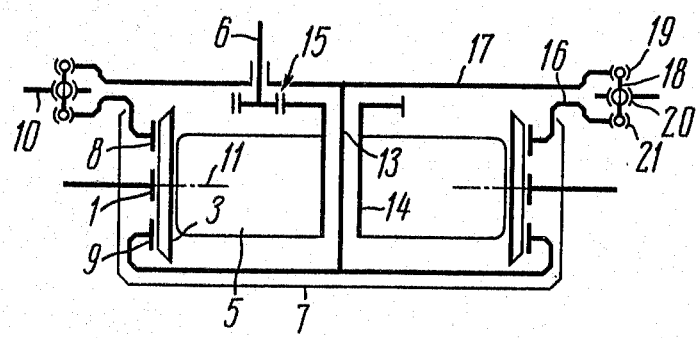

HARMONIC GEAR REDUCTION UNIT

This invention relates to harmonic gear reduction units for considerably changing rotational speeds and torques transmitted from an input member 10 to an output member of the gear reduction unit. This invention may be used in devices and apparatus requiring large reduction in speed and great increase in torque for transmitting a rotary motion from a drive motor shaft to actuating units and mechanisms such as those used to rotate cranes, excavators, large radiolocators, rotary antennae, as well as in mechanisms for turning the wheels of trailers, special pneumatic wheel undercarriages or to impart a rotary motion to rotary tables of machine tools, arms of welding manipulators, turning devices and tilters, etc.

Known in the art is a harmonic gear reduction unit comprising a rigid member made in the form of a gear wheel; a flexible member made in the form of a thin-walled tube with a gear rim; and a wave generator provided with elements located in the immediate vicinity to said flexible member for imparting thereto radially directed deformations so as to ensure an engagement between the teeth of said flexible member and those of the rigid member. The rigid member is connected directly to the reduction gear unit housing, one end of the flexible member being connected to an output member of the gear reduction unit by means of a coupling and the wave generator being coupled to the input member of the reduction unit. With this arrangement of the gear reduction unit, the rigid member may be connected to the output member, while an end of the flexible member is coupled to the gear reduction unit housing through a coupling.

A diaphragm has been used in the above-described gear reduction units as a coupling adapted to interconnect the flexible member and the output member (i.e. the housing), said coupling preventing the walls of the flexible member from being moved in radial direction at the joint between this member and the diaphragm. To ensure radially directed deformations of the walls of the flexible member along the axis of engagement of the teeth of the latter with those of the rigid member, it is advisable to locate the diaphragm at a substantial distance from the axis of the engagement of the teeth.

Furthermore, with such an arrangement of the coupling, a misalignment occurs in the engagement between the flexible and rigid members, thereby leading to uneven contact and uneven load distribution along the teeth of the members resulting in uneven wear of the teeth. In the presence of the teeth misalignment the transmission efficiency is low. To minimize the misalignment between the teeth of the flexible member and those of the rigid member so as to improve the engagement conditions, it is expedient still further to increase the length of the flexible member. As a consequence, the flexible member and the gear reduction unit as a whole have a long axial dimension and posess a considerable mass.

Known in the art is a harmonic gear reduction unit with the use of a movable coupling such as a toothed coupling, said coupling admitting free movement of the flexible member walls during the transmission of a torque from this member to the output member of the reduction unit through the coupling. It is possible with such an arrangement to limit the misalignment between the teeth of the flexible member and those of the rigid member during their engagement as well as to reduce the length of the flexible member. The harmonic gear reduction unit provided with such a coupling is characterized by the shorter axial length than that previously disclosed.

It should be pointed out, however, that the movable coupling may be considered as an additional source of energy losses during the transmission of a torque from an input member to an output member of a gear reduction unit in so far as the teeth of the toothed coupling may also have a misalignment during their engagement. Therefore, the transmission efficiency of the harmonic reduction unit provided with such a coupling is somewhat lower than that desired above.

Known in the art also is a harmonic gear reduction unit with a flexible member made in the form of a short tube with a movable toothed coupling located in the immediate vicinity to the zone of engagement between the teeth of the flexible member and those of the rigid one, said coupling permitting free deformations of the flexible member so as to ensure normal conditions for engagement between the teeth of this member and the teeth of the rigid member. This feature makes it possible to substantially reduce the axial length of the harmonic gear reduction unit.

However, the significant misalignment occuring in the zone of engagement between the teeth of the flexible and rigid members and those of the coupling leads to a considerable wear of the latter. The transmission efficiency is low due to misalignment of said teeth while the reverse transmission efficiency (i.e. the efficiency during the transmission of the torque from the output member to the input member) is near zero. At the same time, a great number of units and devices which are apt to considerable changes in speed and torque during the transmission from the shaft of the motor to actuating elements of the machines call for the high value of the reverse transmission efficiency.

Among other things, the load carrying capacity of the engaged teeth in such a gear reduction unit during the transmission of a torque is rather low because of the edge and point contact in engagement between the teeth of these elements, said contact conditions taking place in the presence of considerable misalignments.

Apart from the above-said, the appreciable misalignments of the flexible member during the transmission of a torque through the gear reduction unit produce high stresses in the walls of said member.

The life of the gear reduction unit and its reliability are substantially restricted due to the aforementioned considerable wear of the teeth of the flexible and rigid members, the low load carrying capacity of said teeth and high stresses in the walls of the flexible member.

The energy losses caused during the operation of such a gear reduction unit by its low transmission efficiency lead to overheating of its parts.

The above-described disadvantages inherent in the harmonic gear reduction units with a flexible member in the form of a short thin-walled tube present a problem for their application of power transmissions with a continuous mode of operation and conversion of the torque transmitted. Such a gear reduction unit is limited to applications where only a change of shaft speeds is required and no need for the torque conversion.

The main object of the invention is to provide a harmonic gear reduction unit characterized by a high transmission efficiency with a low weight and overall dimensions.

Another object of the invention is to provide a harmonic gear reduction unit having little wear of the teeth of the flexible and rigid members and those of the coupling as well as low stresses in the walls of the flexible member and, as a consequence, extended life and high reliabilty in combination with low dimensions and weight.

The above and other objects are achieved by the fact that in a harmonic gear reduction unit comprising a rigid member in the form of a gear wheel, a flexible member in the form of a thin-walled tube provided with a gear rim, and a wave generator connected to an input member of the gear reduction unit provided with elements located in the immediate vicinity to the flexible member for imparting thereto radially directed deformations so as to ensure engagement between the teeth of the rigid member and those of the flexible member, one end of said flexible member being connected to an output member of the gear reduction unit by means of a coupling, according to the invention, the other end of the flexible member is also operatively connected to an output member of the gear reduction unit by means of a second coupling which is symmetrical relative to the first one about the axis of engagement of the teeth of the flexible and rigid members, said elements imparting the radially directed deformations to the flexible member being also arranged in the gear reduction unit symmetrically about the axis of engagement of the teeth of the flexible and rigid members.

Two flanges pivotally connected to each other and to the output member of the gear reduction unit may be positioned coaxially and in close proximity to each other, one flange being linked to the coupling at one end of the flexible member and the other flange being connected to the coupling at the other end thereof, whereby even distribution of the torque transmitted from the flexible member to the output member of the gear reduction unit is ensured between both ends of the flexible member.

With the wave generator located inside the flexible member operative interconnection thereof with the output member of the gear reduction unit may be achieved through a shaft arranged within the wave generator.

Furthermore, a mechanical wave generator may be used in the gear reduction unit provided with a hollow shaft so as to accommodate therein the shaft connecting the second coupling to the output member of the reduction unit, said hollow shaft being operatively connected to the input member of the gear reduction unit by means of a gear transmission.

It is also expedient to use a mechanical wave generator of the type wherein three eccentric sleeves with rolling bearings are rigidly mounted on the hollow shaft so that the rotational axis of the bearing on the intermediate sleeve is shifted to one side about the rotational axis of the wave generator shaft, while the rotational axis of the side bearings are shifted in the opposite direction. It is just said rolling bearings outer rings which engage the inner surface of the flexible member which are used both as a radial support for the wave generator and as the aforementioned elements imparting radially directed deformations to the flexible member.

It is advantageous in this case to fix the wave generator in the reducer about the rotational axis of the output member with respect to the axis of engagement of the teeth of the flexible and rigid members by means of shoulders formed on the elements for positive interconnection between the coupling of the flexible element and the output element of the gear reduction unit, said shoulders engaging the outer rings of the side bearings of the wave generator, while it is advisable to locate between the flexible member and the outer rings of the generator bearings imparting the radially directed deformations to the flexible member a thin-walled ring whose hardness is substantially higher that that of the flexible member.

Both couplings connecting the flexible member with the output member of the gear reduction unit may be comprise tooth couplings with the teeth thereof adapted to be engaged with those of the gear ring of the flexible member. In addition, it is advantageous to arrange both couplings in close proximity to end faces of the rigid member since in this case they act as means for fixing the output member of the reduction gear unit axially relative to the rigid member.

Ther operative interconnection between the flexible member and the output member of the reduction unit through the second coupling may be carried out by means of a hollow shaft arranged coaxially between the wave generator and the flexible member and provided with slots adapted for radical displacements of the elements imparting the radially directed deformations to the flexible member from the wave generator.

It is advantageous in this case to use in the gear reduction unit a mechanical wave gererator with two radial supports and with an oval-shaped cam on the shaft thereof, said cam carrying a flexible rolling bearing with the outer ring of the bearing engaging the elements imparting radially directed deformations to the flexible member, said cam serving also to move said elements in the radial direction. Said elements imparting radially directed deformations to the flexible member from the outer ring of the flexible bearing of the wave generator may be formed as cylindrical rollers.

One of the racial supports of the wave generator may comprise a rolling bearing mounted on the shaft of the wave generator and fixed relative to the housing of the reduction unit, while the second radial support for the wave generator may comprise a flexible bearing with the outer ring of this bearing engaging the elements adapted to impart the radially directed deformations to the flexible member.

The main principle of the invention reside in the following:

Due to the fact that in the harmonic gear reduction unit the other end of the flexible member through the second coupling located symmetrically relative to the first one about the axis of engagement of teeth of the rigid and flexible members is positively connected to the output member of the reduction unit, the torque is transmitted from the flexible member to the output member of the gear reduction unit along two streams diverged symmetrically from the axis of engagement of the teeth of the flexible and rigid members. This provides uniform and symmetrical distribution of forces acting in the engagement between the teeth of the flexible and rigid members as well as those of the symmetrically disposed couplings. The arrangement in the gear reduction unit of the elements imparting radially directed deformations to the flexible member also in symmetry about the axis of engagement of teeth of the flexible and rigid members makes it possible to impart to the flexible member the radially directed deformations which are both uniformly distributed along the length of this element and symmetrical about the axis of engagement of the teeth.

Owing to the uniform and symmetrical distribution of the load and deformations of the flexible member along the length thereof and about the axis of engagement between the teeth of the flexible and rigid members, the engagement between the teeth of said members and those of the couplings is free of misalignments and features a uniform load distribution along the teeth of the members and couplings. This results in low energy losses during the engagement between the teeth of said members and said couplings and provides an increase in the efficiency of the gear reduction unit as a whole during the transmission of a torque from the input member to the output member of the unit. The reverse transmission efficiency of the reducer (i.e. the efficiency when transmitting a torque from the output member to the input one) is also increased.

The elimination of misalignment between the teeth of the flexible member and those of the rigid member and coupling elements, i.e. the elimination of conditions for edge and point contacts between said teeth, makes it possible to minimize the wear of the teeth and to increase their load-carrying capacity during the transmission of torques through the gear reduction unit.

It is precisely the uniform and symmetrical loading and deformation of the flexible member about the axis of engagement of the teeth of said members that reduce stresses in the walls of the flexible member.

The decreased wear of the teeth of the flexible and rigid members and those of the coupling elements, as well as the reduced stresses in the walls of the flexible member promote a prolonged service life and high reliability of the gear reduction unit. The reliability of the reducer is also increased due to the fact that the torque is transmitted from the flexible member to the output member of the reduction unit in two streams so as in case of failure of an element in one stream the gear reduction unit is maintained under operative conditions since the torque can be transmitted along the other stream.

Furthermore, a considerably more smooth and exact rotation of the output member of the gear reduction unit may be achieved due to the uniform load distribution between the teeth of the flexible and rigid members and those of the coupling elements as well as due to the lack of misalignments in said teeth.

Due to the fact that two flanges pivotally connected to each other and to the ouput member of the gear reduction unit are located in close proximity to each other, one of said flanges being connected to the coupling at one end of the flexible member and the second one being connected to the coupling at the other end thereof, the torque transmitted from the flexible member to the output member is distributed uniformly between said both ends of the flexible member. This uniform torque distribution between both ends of the flexible member ensures uniform loading of said member along the length thereof irrespective of the manufacturing accuracy of the coupling elements of said flexible member and regardless of the difference in torsional rigidity of elements included in each torque tranmission stream form the flexible member to the output member of the gear reduction unit. This feature of the unit is of a great importance since it allows less strict requirements to be imposed to the tolerances for the manufacture of the coupling elements.

The most simple and reliable way to operatively interconnect the flexible member and the output member of the reduction unit through the second coupling is to use a shaft accomodated within the wave generator located inside the flexible member.

The use off the mechanical wave generator with the hollow shaft makes it possible to accommodate in said shaft another shaft connecting the second coupling to the output member of the gear reduction unit. In this case, the operative connection between the wave generator shaft and the output member through a gear transmission permits one to increase the gear ratio of the reducer as much as possible.

The gear reduction unit with the mechanical wave generator having three eccentric sleeves each fixed on a hollow shaft and provided with a rolling bearings is the most simple for the manufacture since all parts of such a gear reduction unit have surfaces of revolution which are easy to cut and since usual rolling bearings with rigid rings may be used for the wave generator.

In addition, with three rolling bearings in the wave generator it is advantageous to arrange the outer rings of the bearings imparting the radially directed deformations to the flexible member symmetrically about the axis of engagement of the teeth of flexible and rigid members.

It also should be pointed out that with the use of the three rolling bearings in the wave generator it is possible to provide three points for supporting the wave generator in radial direction against the inner surface of the flexible member. This feature makes it unnecessary to bear the wave generator against the gear reduction unit housing.

The provision of the three rolling bearings used as radial supports for the wave generator with the outer rings of said bearings being in contact with the inner surface of the flexible member ensures self-aligning of the wave generator in a radial direction against the inner surface of the flexible member, the latter in turn being aligned by means of engagement of the teeth of said flexible member with those of the rigid member. Thus, the wave generator is self-aligned through the engagement of the teeth of the flexible and rigid members by means of three rolling bearings, the outer rings of said bearings imparting the radially directed deformations to the flexible member. This feature ensures a uniform load distribution between the zones of engagement of the teeth of these members, that is, between the zones of deformation of the flexible member thereby increasing the load-carrying capacity of the teeth and making it possible to minimize the overall dimensions of the gear reduction unit.

In the embodiment of the gear reduction unit wherein the wave generator is fixed axially against the rotational axis of the output member of the reduction units about the axis of engagement of the teeth of the flexible and rigid members by means of shoulders formed on elements for operative interconnection between the couplings of the flexible member and the output member of the gear reduction unit, said shoulders engaging the outer rings of the extreme bearings of the wave generator, it is possible to decrease the overal dimension of the gear reduction unit.

The location of a thin-walled ring between the flexible member and the outer rings of the wave generator bearings with the hardness of said thin-walled ring being such higher than that of the flexible member makes it possible to substantially reduce the contact stresses on the inner surface of the flexible member, to prevent flatening of this inner surface under the action of the outer rings of the wave generator bearings and, as a consequence, to increase the life and reliability of the gear reduction unit as a whole.

In the embodiment with tooth couplings used to connect the flexible member to the output member of the gear reduction unit the flexible member may be formed with an outer gear rim, the teeth of said rim being in engagement both with the teeth of the rigid member and with those of the couplings thereby substantially simplifying the structure of the gear reduction unit.

Due to the fact that the couplings both are located in close proximity to end faces of the stationary rigid member and serve to fix the output member of the reduction unit against movements in axial direction with respect to the rigid member, it is possible to provide the harmonic gear reduction unit of short axial dimension and low weight.

The most compact structure of the gear reducton unit may be achieved in the embodiment wherein operative interconnection between the flexible and output members of the reduction unit through the second coupling is carried out by means of a hollow shaft arranged coaxially between the wave generator and the flexible member, said hollow shaft being provided with slots permitting movement in he radial direction of the elements adapted to impart to the flexible member the radially directed deformations from the wave generator.

The use in the gear reduction unit according to the invention of the wave generator with an oval-shaped cam fixed to the shaft thereof and provided with a flexible rolling bearing makes it possible to bear against this flexible bearing all the elements accommodated in the slots of the hollow shaft and adapted to impart the radially directed deformations to the flexible member. These elements in turn serve as supports for the flexible member over the periphery thereof. This feature prevents changes in mode of deformations of the flexible member during the loading of the gear reduction unit thereby making it possible to reduce stresses induced in the walls of the flexible member.

The embodiment with the elements imparting radially direted deformations of the flexible member made in the form of cylindrical rollers ensures low friction losses in the engagement between these elements and the walls of the slots in the hollow shaft.

The gear reduction unit with the mechanical wave generator having one of its radial supports in the form of a rolling bearing mounted on the wave generator shaft and fixed in the gear reduction housing and with the other radial support in the form of a flexible bearing is characterized by the ability of said wave generator to be self-aligned radially by means of the engagement of the teeth of the flexible and rigid members through the elements imparting radially directed deformations to the flexible member and engaging the outer ring of the flexible bearing of the wave generator. This features ensures uniform load distribution between the zones of engagement of the teeth of the flexible and rigid members and, therefore, between the zones of deformations of the flexible member thereby making it possible to reduce the radial dimension of the gear reduction unit.

The present invention may best be understood by reference to the following description taken in connection with the accompanying drawings, wherein:

FIG. 1 shows a functional diagram of a harmonic gear reduction unit according to the invention;

FIG. 2 is the same for the second embodiment of the invention;

FIG. 3 is the same for the third embodiment of the invention.

Figure 9:
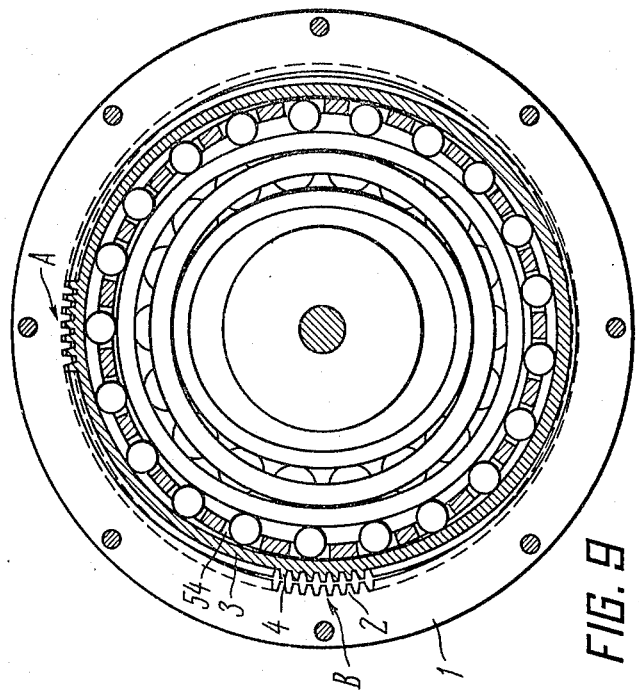
FIG. 9 is a sectional view along the lines IX—IX in FIG. 8.
Figure 8:
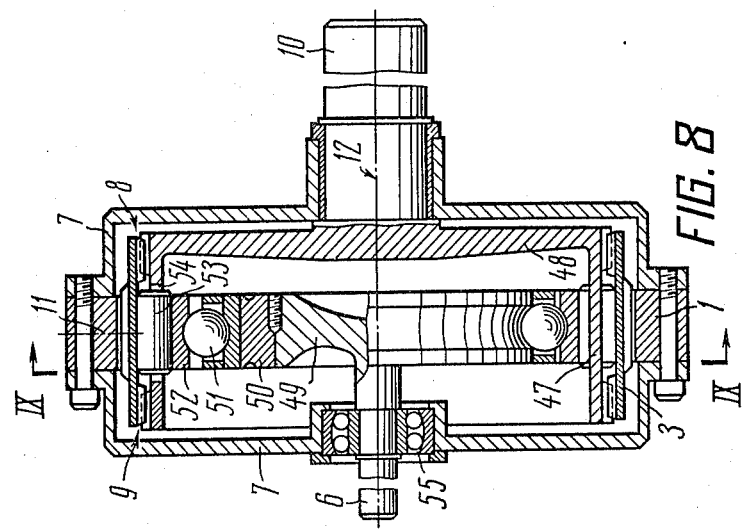
FIG. 8 is a sectional view taken along the rotational axis of the output member of the reduction unit according to the fourth embodiment of the invention.

Referring to the accompanying drawings, a harmonic gear reduction unit comprises: a rigid member in the form of a rigid tooth gear 1 (FIGS. 1 – 5, 7 – 9) having teeth 2 (FIGS. 5 and 9) made in the inner surface thereof, a flexible member 3 (FIGS. 1 – 9) in the form of a thin-walled tube with a gear rim accommodated within the tooth gear 1 and provided with teeth arranged on the outer surface of the flexible member 3; and a wave generator 5 (FIGS. 1 – 3 and 7) with elements adapted to impart deformations to the flexible member 3 and located in close proximity to the inner surface thereof. The wave generator 5 is connected to an input member 6 of the gear reduction unit (FIGS. 2–4, 7 and 8). The rigid tooth gear 1 is connected to a housing 7 of the gear reduction unit. Both ends of the flexible member 3 are linked to an output member 10 of the reduction unit through couplings 8 and 9 (FIGS. 1–4, 7 and 8). One of the coupling 9 is connected to the output member 10 by an operative connecting means. The couplings 8 and 9 are arranged in the gear reduction unit symmetrically about an axis 11 of engagement of the teeth 4 and 2 of the flexible and rigid members respectively.

Rotational axis of the wave generator 5, the flexible member 3, and the output member 10 and the axis of symmetry of the tooth gear 1 coincide and referred to by general reference numeral 12.

According to one embodiment of the invention, the operative connecting means between the coupling 9 and the output member 10 comprises a shaft 13 (FIGS. 1 – 6) accommodated within the wave generator 5.

In case of application in the harmonic gear reduction unit of the wave generator 5 operating on a nonmechanical principle (electromagnetic, hydraulic, pneumatic) (FIG. 1) the functional diagram of the reduction unit is mostly simplified but such a wave generator 5 is characterized by large overall dimensions and complicated structure of its elements.

In the gear reduction unit with the use of the mechanical wave generator 5 (FIGS. 2 and 3) a shaft 14 (FIGS. 2–6) of the latter is made hollow and adapted to accommodate the shaft 13, the shaft 14 of the wave generator 5 being connected to the input element 6 of the gear reduction unit by means of a gear transmission 15.

Where the rotational axes of the input member (6) (FIG. 2) and output member 10 of the reduction unit coincide, the shaft 13 may also be hollow to accommodate therein the elements of the gear transmission 15.

Both ends of the flexible member 3 (FIGS. 1, 2 and 7) are rigidly connected to the output member 10 of the gear reduction unit. Thus, these both ends of the flexible member 3 are found to be rigidly interconnected through the couplings 8 and 9 and the shaft 13.

According to one embodiment of the invention, the connection of both ends of the flexible member 3 to each other and to the output member of the gear reduction unit is carried out by means of two flanges 16 and 17 arranged in close proximity to each other and coaxially to the output member 10 so that the flange 16 is connected to the coupling at one end of the flexible member 3 while the flange 17 is connected through the shaft 13 to the coupling 9 at other end of the flexible member 3. The flanges 16 and 17 are connected to each other and to the output member 10 which is also defined as a flange by means of two uniformly circumferentially spaced rods 18 each provided with three ball joints 19, 20 and 21. The intermediate ball joint 20 of each rod 18 is placed in the output member 10 of the gear reduction unit while the extreme ball joints 19 and 21 respectively are inserted into the flanges 16 and 17. Thus, two ends of the flexible have such an interconnection wherein a balancing of torques transmitted from each end of the flexible member 3 to the output member 10 of the gear reduction unit is ensured.

The following is a detailed description of the gear reduction unit made in accordance with one of the aforementioned functional diagrams.

Figure 4:
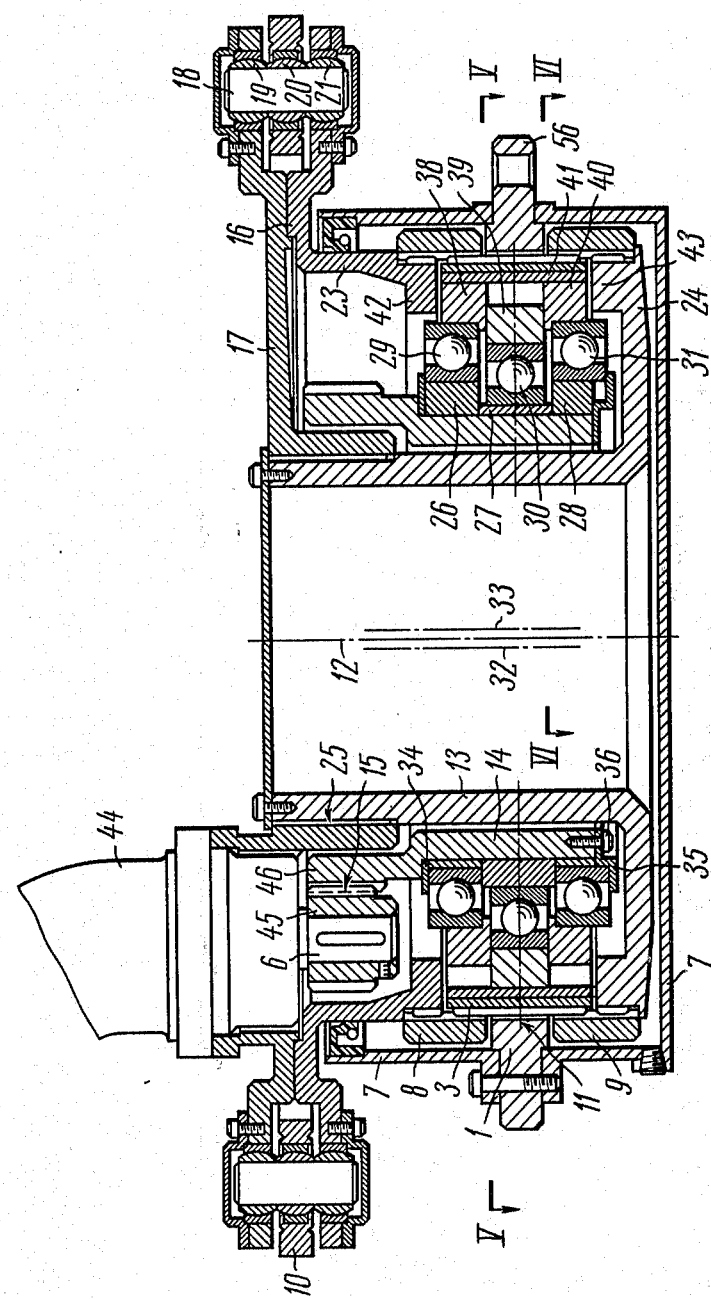
FIG. 4 is a sectional view of a harmonic gear reduction unit according to the third embodiment and taken along the rotational axis of the output member.
Figure 5:
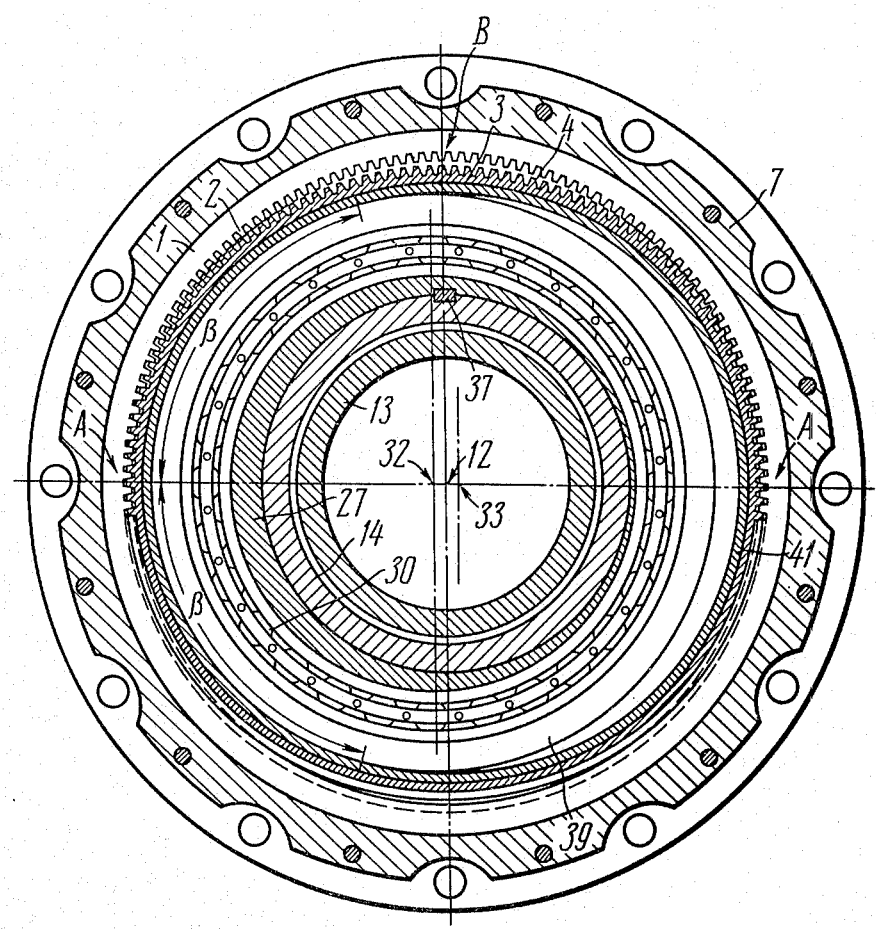
FIG. 5 is a sectional view along the lines V—V in FIG. 4.
Figure 7:
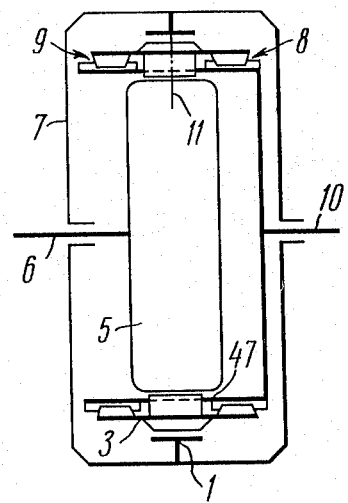
FIG. 7 shows the functional diagram of a harmonic gear reduction unit made in accordance with the fourth embodiment of the invention.
Figure 6:
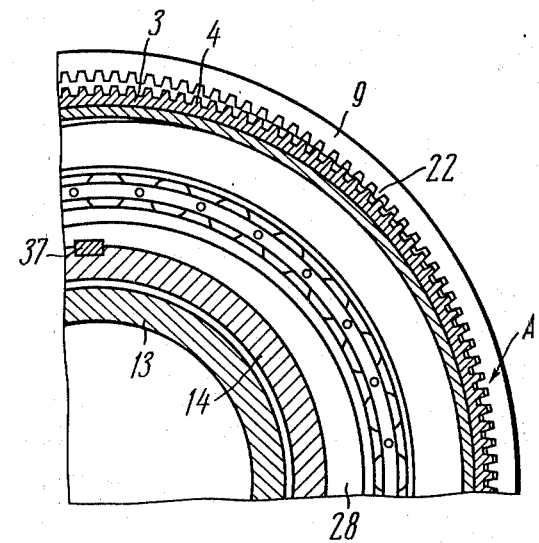
FIG. 6 is a sectional view along the lines VI—VI in FIG. 4.

The couplings 8 and 9 (FIG. 7) comprise tooth couplings, i.e. each coupling is provided with a rim having teeth 22 (FIG. 6). The flexible member 3 comprises a short tube provided with teeth 4 extended along the whole length of the tube (FIG. 5), said teeth engaging both the teeth 2 of the gear 1 and the teeth 22 of the couplings 8 and 9. The clearance between the engaged teeth 4 of the flexible member 3 and those 22 of the couplings 8 and 9 should be large enough to permit deformations of the flexible member 3 under the action of the wave generator elements to ensure engagement between its teeth 4 and the teeth 2 of the gear 1.

The coupling 8 (FIG. 4) of the flexible member 3 is connected to the flange 16 through a hollow shaft 23 made integrally with the flange 16 and coupled to the coupling 8 by means of splines made on the gear rim of the coupling 8. The coupling 9 of the flexible member 3 is connected to the shaft 13 through a flange 24 made integrally with the shaft 13 and connected to the coupling 9 also through splines. Splines 25 are used to join the shaft 13 and the flange 17.

Eccentric sleeves 26, 27 and 28 provided with rolling bearings 29, 20 and 31 respectively are mounted on the hollow shaft 14 of the mechanical wave generator. A rotational axis for the bearing 30 of the intermediate sleeve 27 is offset to one side with respect to the rotational axis 12 of the shaft 14 of the wave generator while a rotational axis 33 of the bearings 29 and 31 of the extreme sleeves 26 and 28 are offset in the opposite direction. The sleeves 26, 27 and 28 along with the roller bearings 29, 30 and 31 are fixed on the shaft 14 against movement in the direction of its rotational axis 12 by means of rings 34 and 35. The ring 34 bears against a shoulder provided for this purpose on the shaft 14 while the ring 35 is fixed to the shaft 14 by means of bolts 36. The rotation of the sleeves 26, 27 and 28 relative to the shaft 14 is prevented by a key 37 (FIGS. 5 and 6).

Rings 38, 39 and 40 are mounted on the rolling bearings 29, 30 and 31 (FIG. 4), said rings serving as elements of the wave generator adapted to impart radially directed deformations to the flexible member 3 through a thin-walled ring 41. The hardness of the thin-walled ring 41 achieved by a thermal treatment should be considerably higher than that of the flexible member 3.

The wave generator is so arranged in the gear reduction unit that is rings 38, 39 and 40 are disposed symmetrically about the axis 11 of engagement between the teeth of the flexible and rigid members and therefore the radially directed deformations imparted from said rings to the walls of the flexible member 3 are distributed uniformly along the length of the flexible member and symmetrically about the axis 11 of the engagement.

By means of the tree rings 38, 39 and 40 the wave generator bears against the inner surface of the flexible member 3 at three points. Contact angles $2\beta$ (FIG. 5) for the rings 38, 39 and 40 of the wave generator bearings may achieve 180 degrees. This feature ensures a stable position of the wave generator in radial direction with respect to the points of engagement between the teeth 4 and 2 of the flexible member 3 and the rigid gear 1 respectively. Therefore, the wave generator is free of radial supports in the housing 7 of the gear reduction unit.

The ability of the flexible member 3 to align in the radial direction by means of engagement between its teeth 4 and the teeth 2 of the rigid gear 1 makes it possible for the wave generator, which bears against the inner surface of the flexible member through the rings 38, 39 and 40 of the rolling bearings 29, 30 and 31, to be self-aligned through the engagement of the teeth 4 and 2. This provides a uniform load distribution between two diametrically opposite zones A (FIG. 5) of engagement between the teeth 4 and 2 of the flexible and rigid members, that is, between the zones of deformations of the flexible member 3.

The wave generator is fixed against movements in the direction of the rotational axis 12 (FIG. 4) of the flexible member 3, said fixing being achieved by means of shoulders 42 and 43 provided on elements connecting the couplings 8 and 9 to the output member 10 of the gear reduction unit 10, i.e. on the hollow shaft 23 and the flange 24. The shoulders 42 and 43 are located close to outer end faces of the rings 39 and 40 and serve to limit the movement of the wave generator as a whole in the direction of the axis 12.

The flexible member 3 and the thin-walled ring 41 are fixed against movement in the direction of the axis 12 also by means of the shoulders 42 and 43 with respect to end faces of the flexible member 3 and the ring 41.

The movement of the output member 10 of the gear reduction unit in the direction of the axis 12 is prevented by the couplings 8 and 9 connected to the output member 10 and located in close proximity to the end faces of the stationary tooth gear 1 as if embracing this gear 1.

The input member 6 of the gear reduction unit comprises a motor shaft 44 (FIG. 4) provided with a tooth gear 45 rigidly fixed thereto. The gear 45 mates with a gear rim 46 located on the shaft 14 of the wave generator.

To decrease the mass of the reduction unit, the shaft 13 is made hollow. The free space in the interior of the shaft 13 may be used for the location of power supply leads to the motor 44 since the latter is mounted on the rotating flange 17.

According to another embodiment of the invention, the operative interconnection between the coupling 9 (FIG. 7) and the output member 10 of the gear reduction unit is achieved through a hollow shaft 47 arranged coaxially to and between the wave generator 5 and the flexible member 3. Slots are provided in the wall of the hollow shaft 47, said slots permitting radially directed movements of the elements adapted to impart the radially directed deformations from the wave generator 5 to the flexible member 3.

The structure of the gear reduction unit made according to this functional diagram is disclosed below.

The flexible member 3 (FIG. 8) comprises a tube with three gear rims. The teeth 4 (FIG. 9) of the gear rim formed on the outer surface of the flexible member 3 are used to engage the teeth 2 of the gear 1. Two other gear rims formed on the inner surface of the flexible member 3 (FIG. 8) along with the gear rims located on the hollow shaft 47 define the couplings 8 and 9 adapted to connect both ends of the flexible member 3 to the output member 10 of the gear reduction unit.

The hollow shaft 47 is connected to the output member 10 by means of a flange 48 made integrally with the hollow shaft 47 and with the output member 10 of the gear reduction unit.

The input member 6 of the gear reduction unit comprises a shaft made integrally with a shaft 49 of the mechanical wave generator. An oval-shaped cam 50 is rigidly fixed to the shaft 49 of the wave generator, said cam carrying a flexible rolling bearing 51 (i.e. the bearing with thin-walled rings). An outer ring 52 of this bearing 51 serves to impart movement in the radial direction to cylindrical rollers 53 used as elements adapted to deform radially the flexible member 3. The cylindrical rollers 53 are accommodated in slots 54 defined in the wall of the hollow shaft 47 and located in symmetry about the axis 11 of engagement between the teeth of the flexible and rigid members, the rollers imparting to the flexible member 3 the radially directed deformations uniformly distributed along the length thereof and symmetrically about the axis 11 of engagement between the teeth of the flexible and rigid members. The slots 54 are adapted to ensure movements of the cylindrical rollers 53 in radial directions and to prevent the latter from movements in the direction of the rotational axis 12 of the output member 10 with respect to the axis 11 of engagement between the teeth of said members.

The wave generator is provided with one radial support against the housing 7 of the unit, said support comprising a spherical rolling bearing 55 mounted on the shaft 49 of the wave generator and fixed in the housing 7 of the gear reduction unit. The flexible bearing 51 is used as a second radial support of the wave generator, said flexible bearing being positioned and aligned by the engagement between the teeth 2 and 4 (FIG. 9) of the gear 1 and the flexible member 3 respectively through the cylindrical rollers 53 engaging both with the inner surface of the flexible member 3 and with the outer ring 52 of the flexible bearing 51.

Thus, the wave generator is capable to be self-aligned through the engagement between the teeth 2 and 4 of the rigid and flexible members thereby ensuring a uniform load distribution between the zones of engagement of said teeth, that is, between the zones of deformation of the flexible member 3.

The harmonic gear reduction unit operates in the following manner.

The flexible member 3 is mounted on the wave generator (FIG. 3) in the state of elastic deformation. The rings 38, 39 and 40 of the wave generator give the flexible member 3 an oval shape and ensure in the zones close to apexes of the oval the engagement of the teeth 4 of the flexible member 3 with the teeth 2 (FIG. 5) of the gear 1 and with the teeth 22 (FIG. 6) of the couplings 8 and 9 for the whole effective height of said teeth while in the zones B adjoining the points of intersection between the flexible member walls and the short axis of the oval teeth 4 are completely disengaged and moved clear off the teeth 2 (FIG. 5) of the gear 1.

During the operation of the gear reduction unit the rotation from the input member 6 thereof (FIG. 4) is transmitted through the gear 45 mating with the gear ring 46 to the shaft 14 of the wave generator. This rotation of the shaft 14 causes rolling of the rings 38, 39 and 40 over the inner surface of the flexible member 3 which in turn results in movement of zones A (Fig. 5) of engagement between the teeth 2 and 4 of the associated members around the periphery of the flexible member 3 thereby inducing a wave of deformation in the flexible member 3, said deformation wave being also moved around the periphery of the flexible member.

Let us take the following letter symbols for designation of elements in a wave stage of the gear reduction unit:

H — wave generator;
g — flexible member 3;
b — rigid tooth wheel 1.

Upon $\tau_g$ revolution the shaft 14 of the wave generator that is, after its revolution through an angle $\phi_H$ equal to 360 degrees ($\phi_H = 360°$), the deformation wave of the flexible member 3 and that of the zone A of engagement of the teeth 4 thereof with the teeth 2 of gear 1 will also follow the same 360° around the periphery of the flexible member. As this takes place and taking into account the act that the number of teeth $Z_g$ of the flexible member 3 is less than the number of teeth $Z_b$ of the rigid tooth ear 1 which is a stationary gear, the flexible memer 3 will rotate in the direction opposite to that of the wave generator shaft 14 by an angle $\phi_g$ equal to a product of the angular pitch $\tau_g$ of the flexible member 3 by the difference in the number of teeth $(Z_g - Z_b)$ between the flexible member 3 and those of the rigid member 1, said angle $\phi_g$ being expressed by the following equation:

$$\phi_g = \tau_g(Z_g - Z_b) \qquad (1) \text{ ps}$$

wherein the angular pitch $\tau_g$ of the flexible member 3 is a central angle for a concentric circle of the gear rim of his member 3 equal to:

$$\tau_g = 360°/Z_g \qquad (2)$$

In view of the above, the following may be written:

$$\phi_g = 360°(Z_g - Z_b)/Z_g \qquad (3)$$

A gear ration $i_{Hg}{}^b$ of the wave stage of the gear unit expressing the change in speed of rotation during the transmission of this rotation from the shaft 14 (Fig. 4) of the wave generator to the flexible member 3 with the rigid gear 1 being stationary is equal to ratio between the angle $\phi_H$ of rotation of the shaft 14 and the corresponding angle $\phi_g$ of rotation of the flexible member 3, said ratio being expressed with the following equation:

$$i_{Hg}{}^b = \phi_H/\phi_g \qquad (4)$$

Knowing the expressions for the angles $\phi_H$ and $\phi_g$ and after appropriate conversions the following will be obtained:

$$i_{Hg}{}^b = z_g/(Z_g - Z_b) \qquad (5)$$

The upper index in designation $i_{Hg}{}^B$ of the gear ratio is used to indicate which element of the wave stage is stationary, the first lower index shows the element wherefrom the rotation is transmitted while the second lower index shows the element receiving this rotation.

The difference in the number of teeth $(Z_g - Z_b)$ between the flexible member 3 and the rigid member 1 is multiple to the number of maximum deformation zones A of the flexible member 3 (Fig. 5), that is, multiple to 2. Therefore, a great change of the rotational speed, i.e. a large gear ratio during the transmission of rotation from the wave generator shaft 14 to the flexible member 3, may be achieved in the wave stage of the gear reduction unit. For example,, $Z_g = 300$, $Z_b = 302$; $i_{Hg}{}^b = -150$. The minus before the value of the gear ratio indicates that the shaft 14 of the wave generator and the flexible member 3 rotate in opposite directions.

The number of teeth 22 (Fig. 6) of the couplings 8 and 9 is equal to the number of teeth 4 of the flexible member 3. Therefore, during the rotation of the shaft 14 of the wave generator and durng the propagation of the deformation wave around the periphery of the flexible member 3, the couplings 8 and 9 do not rotate with respect to the flexible member but rather rotate therewith.

The torque is transmitted from the coupling 8 through the hollow shaft 4 (Fig. 4) to the flange 16 while the rotation from the coupling 9 is transmitted via the flange 24 and the shaft 13 to the flange 17. Further from the flanges 16 and 17 the torque and rotation are transmitted by means of rods 18 with the ball joints 19, 20 and 21 to the output member 10 of the gear reduction unit. As the ball joints 20 are located on the rods 18 just in the middle between the ball joints 19 and 21, equal torques will be transmitted from the flanges 16 and 17 to the output member 10. This means that equal torques are transmitted in two streams to the output member of the gear reduction unit from both ends of the flexible member 3. The shafts 13 and 23 exhibit different torsional rigidity and, therefore, the flanges 16 and 17 will turn with respect to each other about the axis 12 upon loading the gear reduction unit accompanied by elastic twisting of the shafts 13 and 23 from equal torques for different angles. In so doing, the rods 18 will be deflected from the original position occupied before loading of the gear reduction unit. As the ball joint 20 maintains its position in the middle with respect to the ball joints 19 and 21, equal torques are transmitted in this case from the flanges 16 and 17 to the output member 10, the same condition being true for transmission of equal torques from both ends of the flexible member 3. This fact ensures uniform and symmetrical loading of the flexible member 3 along the length of its wall irrespective of the relationship between the torsional rigidities of the elements included in each stream of torque transmission from both ends of the flexible member 3 to the output member 10 of the gear reduction unit, as well as irrespective of the difference existing in the couplings 8 and 9.

Thus, in the gear reduction unit the rotation and torque are transmitted from the input member 6 (Fig. 4) through the tooth gears to the shaft 14 of the wave generator. The rotation of this shaft along with the interaction between the rings 38, 39 and 40 and the inner surface of the flexible member 3 produce in the flexible member a wave of deformation propagated around the periphery thereof, the engagement between the teeth 4 and 2 of the flexible and rigid members leading to rotation of the flexible member with the rigid member 1 being stationary. The rotation is further transmitted through the couplings 8 and 9 from both ends of the flexible member 3 in two streams diverged symmetrically from the axis 11 of the engagement between the teeth of the flexible and rigid members to the output member 10 of the gear reduction unit. This feature ensures a uniform and symmetrical loading of the flexible member 3 along the length of its wall under the action of forces in the engagement between the teeth 4 of the flexible member 3 and the teeth 2 of the rigid member 1, as well as under the action of forces in symmetrically arranged couplings 8 and 9.

A torque reaction is generated in the rigid gear 1 from the forces acting in the engagement between the teeth 2 of said gear and those 4 of flexible member 3 during the operation of the gear reduction unit, this reaction torque being transmitted to a connecting flange 56 of the rigid gear 1. Thus, as the housing 7 of the gear reduction unit proves to be loaded by a torque, it may have a form of a thin-walled casing.

The change of speed during the transmission of rotation from the input member 6 (Fig. 4) to the output member 10 is carried out in this gear reduction unit through the engagement between the teeth of the gear 45 and those of the gear rim 46 of the wave generator shaft 14 as well as through the engagement between the teeth 4 of the flexible member 3 and the teeth 2 of the rigid gear 1. The total gear ratio may be achieved within limits $i = 80 - 2000$.

The gear reduction unit may be used without rotation of the output member 10. In this case with rotation of the shaft 14 of the wave generator and propagation of the deformation wave around the periphery of the flexible member 3 the rigid gear 1 will be set into motion. Thus only the torque reaction will be transmitted to the output member 10 through the couplings 8 and 9 from both ends of the flexible member 3.

The harmonic gear reduction unit with the coaxially arranged hollow shaft 47 (Fig. 8) connecting the coupling 9 of the flexible member 3 to the output member 10 of the unit operates in much the same way. The distinguishing feature of this gear reduction unit consists in that the generation of the deformation wave in the flexible member 3 and the moment of zone A (Fig. 9) of engagement between the teeth 4 and 2 of associated members are caused by the rotation of the oval-shaped cam 50 which cam imparts deformations to the rigid member 3 through the flexible rolling bearing 51 and the cylindrical rollers 53.

As it follows from the above description, due to the uniform and symmetrical loading and deformation of the flexible member, the unit is free of misalignments in the engagement between the teeth of the flexible and rigid members and those of the couplings. Furthermore, the gear reduction unit is characterized by uniform contact and load distribution along the teeth of said members and those of the coupling elements, that is, the conditions for edge or point contact between said teeth are eliminated, and upon loading the gear reduction unit by torque the engaged teeth have surface contact along the whole length thereof.

This feature makes it possible to substantially reduce teeth wear of said members and said coupling elements and at the same time to increase the load-carrying capacity thereof.

For the same reason, it is possible to minimize energy losses in the engagement between the teeth of the engaged members and to increase the transmission efficiency of the harmonic gear reduction unit as a whole. The efficiency of the harmonic gear reduction unit with flexible member in the form of a short tube having the ratio between the length and outside diameter equal 0.2 (without consideration of losses in the additional gear transmission 15) (Fig. 4) may be achieved within the range of 0.72 – 0.76 in distinction to conventional harmonic gear units having for the same dimension relationship of the flexible member the transmission efficiency within the range of 0.6 – 0.65.

The uniform and symmetrical loading and deformation of the flexible member also aid in reduction of stresses induced in the walls of the flexible member.

Due to reduced wear of the teeth of the flexible and rigid members and those of the coupling elements as well as due to reduced stresses in the walls of the flexible member, it is possible along with the small dimensions and weight to increase the service life and reliability of the gear reduction unit.

What is claimed is:

1. A gear reduction unit comprising: input and output members; a rigid member in the form of a gear wheel; a flexible member in the form of a thin-walled tube provided with a gear rim; a wave generator connected to said input member of the gear reduction unit; a first coupling connecting one end of said flexible member to said output member of the gear reduction unit; a second coupling arranged symmetrically with respect to said first coupling about the axis of engagement between the teeth of said flexible and rigid members of the gear reduction unit and serving to connect the other end of said flexible member of the gear reduction unit to the output member of the gear reduction unit; a positive connection adapted to connect said other end of the flexible member through said second coupling to said output member of the gear reduction unit; elements arranged in the gear reduction unit in close proximity to said flexible member also symmetrically about the axis of engagement between the teeth of said flexible and rigid members and adapted to impart radially directed deformations from said wave generator to said flexible member so as to ensure engagement of the teeth of said rigid member with those of the flexible member, two flanges pivotally connected to each other and to the output member of the gear reduction unit being arranged coaxially to the flexible member in close proximity ot each other, one of said fanges being connected to the coupling at one end of the flexible member while the other of the flanges is connected to the coupling at other end thereof thereby ensuring uniform distribution of the torque transmitted from the flexible member to the output member between both ends of the flexible member.

2. A gear reduction unit comprising: input and output members; a rigid member in the form of a gear wheel; a flexible member in the form of a thin-walled tube provided with a gear rim; a wave generator connected to said input member of the gear reduction unit; a first coupling connecting one end of said flexible member to said output member of the gear reduction unit; a second coupling arranged symmetrically with respect to said first coupling about an axis of engagement between the teeth of said flexible and rigid members of the gear reduction unit and serving to connect the other end of said flexible member to the output member of the gear reduction unit; a positive connection adapted to connect said other end of the flexible member through said second coupling to said output member of the gear reduction unit, elements arranged in the gear reduction unit in close proximity to said flexible member also symmetrically about the axis of engagement between the teeth of said flexible and rigid members and adapted to impart radially directed deformations from said wave generator to said flexible member so as to ensure engagement of the teeth of said rigid member with those of the flexible member, two flanges pivotally connected to each other and to the output member of the gear reduction unit being arranged in the gear reduction unit coaxially to the flexible member in close proximity to each other, one of said flanges being connected to the coupling at one end of the flexible member while the other of the flanges is connected to the coupling at the other end thereof thereby ensuring uniform distribution of the torque transmitted from the flexible member to the output member between both ends of the flexible member, when arranging the wave generator inside the flexible member an operative connection thereof to the output member of the gear reduction unit through the second coupling being carried out by means of a shaft positioned inside the wave generator.

3. A gear reduction unit according to claim 2, wherein a mechanical wave generator is provided, a shaft of said wave generator being made hollow to accommodate therein a shaft connecting the second coupling to the output member of the gear reduction unit and is operatively connected to the input member of the gear reduction unit through a gear transmission.

* * * * *